April 9, 1940.    G. F. DRAKE    2,196,197
SYSTEM OF CONTROL
Filed April 16, 1934    2 Sheets-Sheet 1
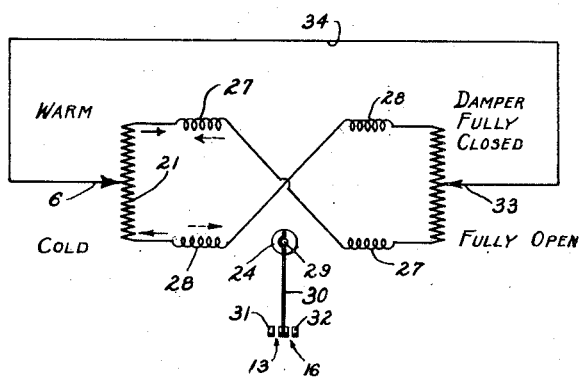
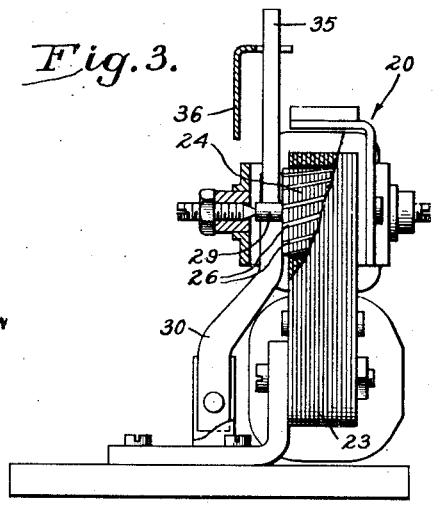
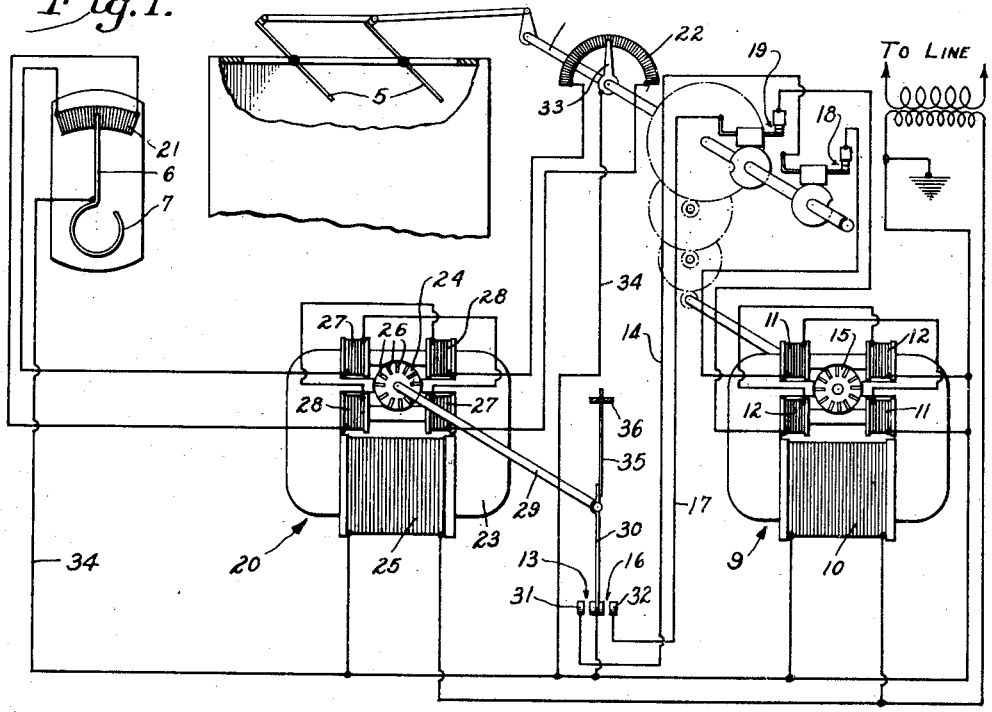
INVENTOR
George Forrest Drake
BY
ATTORNEYS April 9, 1940.　　　　G. F. DRAKE　　　　2,196,197
SYSTEM OF CONTROL
Filed April 16, 1934　　　2 Sheets-Sheet 2

INVENTOR
George Forrest Drake
BY
Lindahl, Parker & Carlson
ATTORNEYS

Patented Apr. 9, 1940

2,196,197

UNITED STATES PATENT OFFICE 2,196,197

SYSTEM OF CONTROL

George Forrest Drake, Rockford, Ill., assignor, by mesne assignments, to Barber-Colman Company, Rockford, Ill., a corporation of Illinois Application April 16, 1934, Serial No. 720,835

17 Claims. (Cl. 236—74)

This invention relates to the positioning of devices such as valves and dampers under the control of thermostats or other sensitive automatic control instrumentalities located at a remote point. Systems of this character have been constructed wherein the position of the device is determined by balancing two electrical resistances against each other, the values of the resistances being varied in accordance with the movements of the device and the sensitive control element.

One object of the present invention is to provide in a system of the above character a novel electric circuit arrangement by which the burden on the controlling instrument is reduced to a minimum and its service life correspondingly prolonged without at the same time decreasing its sensitivity.

More particularly, the invention aims to provide a control of the character above referred to in which the power consumed in the circuit controlled by the sensitive control instrument is reduced to a small value and the instrument is called upon to control only the unbalanced power of the two opposing circuits.

Another object is to provide a novel relay construction for enabling a balanced control of the above character to be obtained without accurate construction and delicate adjustment of the relay parts.

A further object is to provide a novel control system in which one power actuated regulating device is caused to follow the movements of another regulator, the position of which is determined by a sensitive control device.

Other objects and advantages of the invention will become apparent from the following detailed description taken in connection with the accompanying drawings, in which:

Figure 1 is a schematic view and wiring diagram of a control system embodying the features of the present invention.

Fig. 2 is a simplified diagram.

Fig. 3 is a fragmentary sectional view of the magnetic relay.

Figure 4:
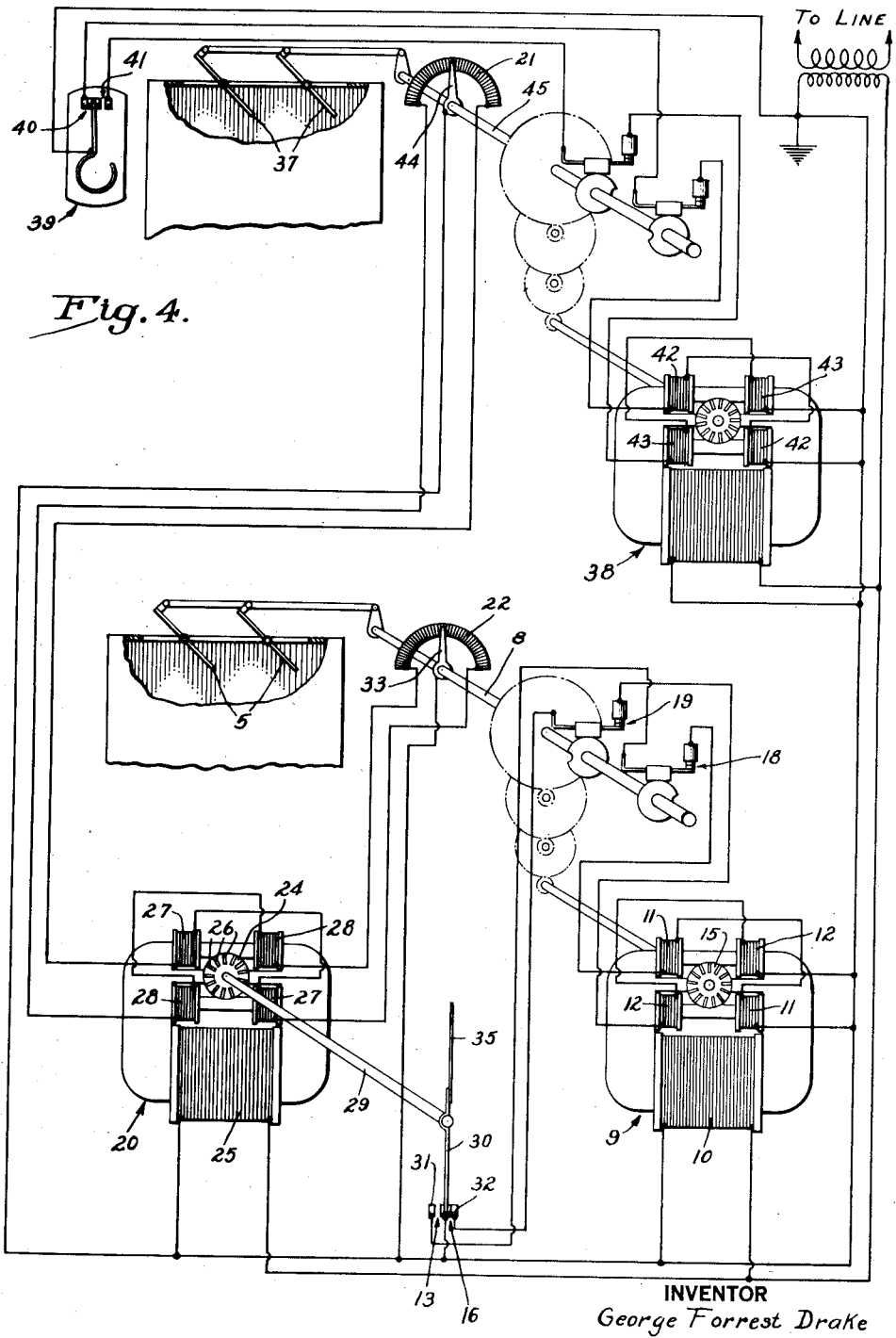
Fig. 4 is a schematic view and wiring diagram of a modified form of the invention.

Referring first to Fig. 1 of the drawings, the invention is embodied in a system in which a damper 5 which may be used for regulating the flow of an air conditioning medium is variably positioned in accordance with changes in the position of an arm 6 which, in the present instance, is actuated by a thermostatic element 7. Herein the damper is arranged to be moved back and forth between limit positions and maintained in any intermediate position by an electrically driven operator comprising a main operating shaft 8 connected to the damper and driven through speed reduction gearing by a reversible electric motor 9.

The motor illustrated is of the shading coil type having a main winding 10 constantly energized by alternating current and controlled by the selective short-circuiting of shading coils 11 and 12 on the stator poles. The arrangement is such that when the coils 11 are short-circuited by closure of a switch 13 in a circuit 14 extending through the coils, the magnetic field will shift around the rotor 15 in a clockwise direction causing the rotor to turn in the same direction thereby moving the damper slowly toward closed position. When a switch 16 in a circuit 17 through the coils 12 is closed, these coils will be short-circuited and the damper will be opened. The position of the damper is maintained by the operator when both the switches 13 and 16 are open. Limit switches 18 and 19 are arranged in the shading coil circuits 14 and 17 and arranged to be opened respectively in the closed and open positions of the damper.

The switches 13 and 16 are actuated by a novel double acting relay 20 controlled by a potentiometer system having two circuits which are balanced against each other by varying, in accordance with changes in the positions of the damper 5 and the thermostat arm 6, the proportions of two resistance elements 22 and 21 which are included in the circuits. The relay is arranged to operate upon alternating current and comprises a magnetic field member 23 providing two poles upon opposite sides of a rotatably mounted armature 24 and arranged to be energized by a winding 25 which is excited constantly by alternating current during operation of the system. The armature comprises a cylindrical iron core having inductor bars 26 thereon forming a squirrel-cage winding.

Enclosing corresponding side portions of the magnet poles on diametrically opposite sides thereof are two connected shading coils 27 comprising a relatively large number of turns, 500 turns of No. 34 wire in the present instance, and connected in series relation. When short-circuited, these coils act in a well known manner to cause a rotational torque acting in a clockwise direction on the armature. Similar coils 28 enclosing the other side portions of the poles produce a counter-clockwise torque when short-circuited.

The armature 24 is fast on a shaft 29 carrying an arm 30 having thereon a movable contact disposed between and cooperating with two stationary contacts 31 and 32 to form the switches 13 and 16. Thus when the coils 27 exert the predominating shading effect, the armature will turn in a direction to close the switch 13 while the switch 16 will be closed when the shading effect of the coils 28 predominates. The contacts 31 and 32 are spaced apart a distance such that when the arm 30 is disposed midway between them, both of the switches 13 and 16 will be open and the damper operator will remain idle.

The present invention takes advantage of the fact that the shading coils 27 and 28, when similarly constructed and short-circuited through conductors of equal resistances, will produce equal shading effects and substantially equal and opposite torques on the armature. Accordingly a novel potentiometer circuit arrangement is provided for controlling the relative shading effects of the two coil pairs 27 and 28 in accordance with changes in the positions of the thermostat arm 6 and the damper 5 with the result that the power operator will cause the damper to follow the movements of the thermostat arm. To this end, the thermostat arm 6 is arranged to slide across the resistance element 21, moving to the left for example as the temperature of the air to which it is exposed rises and to the right as the temperature falls. Assuming that the damper 5 is to be moved toward closed position as the temperature affecting the thermostat increases, opposite ends of the resistance element 21 corresponding to the high and low temperatures will be connected to the coils 27 and 28 respectively. The resistance element 22 is engaged by a wiper arm 33 fast on the shaft 8, and the ends corresponding to the open and closed positions of the damper 5 are connected respectively to the coils 27 and 28. The contact members 6 and 33 are joined by a conductor 34.

Assuming that the arms 6 and 33 are in intermediate positions as indicated in the simplified diagram of Fig. 2, it will be apparent that the short-circuit for the coils 28 includes the lower part of the element 21, the conductor 34 and the upper part of the element 22 while the remaining portions of the elements 21 and 22 are included in the circuit of the coils 27. When the resistances of these two circuits are equal, the coils 27 and 28 will exert equal and opposite shading effects and the switch arm 30 will hold both of the switches 13 and 16 open, the position of the damper thus remaining fixed. Now assuming that the thermostat arm is moved in response to a decrease in temperature causing the resistance of the circuit for the coils 27 to be increased and that of the coils 28 to be decreased. Under the predominating shading effect of the coils 28, the relay will close the switch 16 causing the motor 9 to be operated in a direction to open the damper 5. As an incident to this, the wiper arm 33 will be moved in a direction to decrease the resistance of the circuit of the coils 27 and increase the resistance of the other circuit, thereby decreasing the predominating shading effect of the coils 28. This movement of the damper continues until the change in the shading effects produced by the thermostat has been fully compensated for by movement of the arm 33 and the shading effects of the two coil pairs again equalized whereupon the damper operator is stopped. Reverse movement of the damper will be initiated in a similar way as the thermostat arm moves to the left as viewed in Fig. 1 which results in closure of the switch 13 under the predominating influence of the shading coils 27. Thus, it will be seen that the damper will always follow the movements of the thermostatic arm 6 as the position of the latter varies with temperature changes.

It is contemplated that the coils 27 and 28 will be so arranged in the potentiometer circuits that the voltages across the two circuits between the two contact arms 6 and 33 will be in opposition to each other as indicated by the directional arrows in Fig. 2. As a result, the current flowing in the common conductor 34 will be proportional to the unbalanced voltage, and when equilibrium is established, no current will flow through the point of contact between the resistance element 21 and the thermostat arm 6 owing to the balanced voltage. Thus the thermostat switch is called upon to carry only the unbalanced current; consequently the power burden on the thermostat switch will be reduced to a minimum.

The relay 20 also possesses characteristics which contribute to the extremely low burden on the thermostat in the present instance. Thus, it will be seen that the shading coils 27 and 28 constitute the source of power which is applied to the potentiometer control circuits. This power is derived by electromagnetic induction and does not include all of the magnetic losses incident to the operation of the relay; consequently the power which must be controlled by the thermostat in the unbalanced condition of the circuits amounts to only a fraction of the total input to the relay winding 25. As a result of the low power consumption in the control circuits and the fact that only the unbalanced current flows through the thermostat contacts, the burden on the thermostat is reduced to a negligible value so that an instrument having a high degree of sensitivity will operate for long periods of service use without objectionable deterioration due to arcing at its contact surfaces.

The present relay is also advantageous in that it is operated by alternating current and the torque exerted on the switch arm 30 is substantially constant for all positions of the latter. This results from the use of a rotary armature which, in all of its positions, remains equidistant from the pole faces of the magnet. As a result, there is no A. C. contact chatter and no delicate adjustment is required in order to insure proper positioning of the switch arm 30 between the contacts 31 and 32 when the shading effects of the controlling coils are in balance.

The use of the motor 20 acting as a relay to control the main damper motor 9 is also advantageous for several reasons. First, the full power capable of being developed by the motor 9 is available for operating the damper. Secondly, only a small friction load is imposed upon the relay which load remains substantially constant. The relay is thus adapted to respond to small degrees of unbalance between the potentiometer circuits. As a result, the driven member, that is, the damper 5 will closely follow the movements of the control member 6.

If desired, separate means may be provided for exerting light forces tending to maintain the relay switch arm in its intermediate position, and thereby preventing hunting and compensating for slight variations in the opposing torques exerted on the rotor when a condition of balance obtains. This means may take the form of a leaf spring 35 secured at one end to the arm 30 and anchored at the other end in a bracket 36. When thus arranged, the spring tends to center the arm 30 between the contacts 31 and 32.

Fig. 4 shows an application of the arrangement above described for positioning one regulating device such as the damper 5 in accordance with the movements of another power operated regulator which may be located at a remote point of control. Herein the latter regulator comprises a damper 37 arranged to be moved back and forth by an operator constructed similar to the operator for the damper 5 and driven by a reversible motor 38 controlled by a sensitive device such as a thermostat 39. The thermostat has two switches 40 and 41 arranged to short-circuit the shading coils 42 and 43 respectively so that the damper 37 is moved in one direction while the switch 40 is closed and in the opposite direction when the switch 41 is closed. In this way, the thermostat 39 governs the extent and direction of movement of the damper in response to temperature fluctuations relative to a value predetermined by the setting of the thermostat.

The resistance element 21 is in this instance, arranged in the potentiometer circuit in the same manner as in the form shown in Fig. 2, its wiper arm 44 being mounted on a shaft 45 by which the damper 37 is actuated so that the resistance of the two circuits is varied in accordance with the movements of the damper 37. Thus, as the damper 37 moves back and forth under the control of the thermostat, the shading effects of the relay coils 27 and 28 are varied thereby destroying the balanced condition of the relay 20. As a result, the damper 5 is operated in a direction to compensate for the variation finally coming to rest when a balanced condition has again been established. In this way, the damper 5 follows the movements of the damper 37. It will be apparent that by properly arranging the resistance elements 21 and 22 in the control circuits for the relay, the damper 5 may be moved either toward open or closed position as the damper 37 is opened.

No claim is made herein to subject matter common to this application and my Patent No. 2,123,182 issued July 12, 1938, to which the present application is subordinate.

I claim as my invention:

1. A control system of the class described comprising, in combination, a regulating device, an electrically driven power operator therefor having two windings selectively energizable to cause movement of said device in opposite directions, two switches controlling the energization of the respective windings, a member movable in opposite directions to actuate said switches selectively, a rotatably mounted induction rotor connected to said switch-actuating member, an alternating current magnet providing a plurality of poles around said rotor and having a pair of shading coils thereon adapted when short-circuited to induce movement of said rotor in opposite directions, two resistance elements each having its opposite ends connected to one terminal of the respective shading coils, two contact members respectively engaging said elements and movable to vary the resistance of the shading coil circuits, a conductor forming a short-circuit connection between said contact members, one of said contact members being movable in unison with said regulating device, and a sensitive control instrument such as a thermostat arranged to effect relative movement between the other contact member and the resistance element engaged thereby.

2. A control system of the class described comprising, in combination, a regulating device to be moved in opposite directions and maintained in various positions, an alternating current relay having an armature and two shading windings acting when short-circuited to induce movement of the armature in opposite directions, potentiometer circuits for short-circuiting said windings and varying the relative shading effects thereof including two resistance elements and contact members engaging the respective elements, a sensitive control instrumentality for effecting relative movement between one of said contact members and its resistance element, means movable in unison with said regulating device for effecting relative movement between said other contact member and resistance element, a power operator for actuating said regulating device, and means actuated by said armature for controlling said operator to determine the direction and extent of movement of said regulating device.

3. A control of the class described comprising, in combination, a double-acting alternating current relay having an armature movable between two limit positions and two windings respectively operable to induce movements of said armature in opposite directions, a potentiometer system including two rheostats and two circuits controlled thereby with the respective windings included therein, said windings having currents induced therein and constituting the sole sources of current supply for said system, a regulating device to be operated, a power driven operator for actuating said device and effecting relative movement between the contact members of one of said rheostats, control means actuated by said armature for governing the operation of said operator to determine the direction and extent of movement of said regulating device, and a sensitive control instrument operable automatically to effect relative movement between the contact members of said other rheostat.

4. A control of the class described comprising, in combination, a regulating device to be moved varying distances in opposite directions, a power driven operator therefor, an automatic sensitive control instrument such as a thermostat, a magnetic member having pole faces providing a cylindrical armature recess, an armature rotatably mounted in said recess and movable in opposite directions between two limit positions while being maintained a fixed distance from said faces, two windings associated with said member and operable selectively to induce movements of said armature in opposite directions, control means actuated by said armature and controlling said operator to govern the direction and extent of movement of said device, and two control circuits arranged in parallel relation and each including a variable resistance and one of said windings, the values of said resistances being varied automatically in accordance with the movements of said instrument and said device whereby to balance the resistances of said circuits and maintain said armature in an inactive intermediate position.

5. A control of the class described comprising, in combination, a regulating device, a double-acting relay having an armature and two windings respectively operable to cause movement of said armature in opposite directions, two resistance elements, a connection between two ends of said elements having one of said windings interposed in series therein, a connection between the other ends of said elements having said other winding interposed therein, contact members engaging the respective resistance elements and directly connected electrically independently of said windings, one of said resistance elements and the associated contact member being relatively movable, a power driven operator for actuating said regulating device and effecting relative movement between the other contact member and the resistance element engaged thereby whereby to compensate for changes in the resistance of the winding circuits produced by relative movement of said relatively movable element and contact member, and means actuated by said armature and controlling said operator to govern the direction and extent of movement of said regulating device.

6. A control system of the class described comprising, in combination, a regulating device, a power operator therefor, a magnetic relay having an armature movable between two limit positions and two windings adapted to exert oppositely directed forces on said armature, means controlling said operator to cause movement of said device in opposite directions when the armature is in opposite limit positions and to maintain the operator idle when the armature is in an intermediate position, two resistance elements and contact members engaging the same, a conductor electrically connecting said contact members directly and independently of said windings and said elements, means actuated by said operator for effecting relative movement between one of said elements and the contact member engaged thereby, a circuit extending through one of said windings, said conductor and part of said resistance elements, and a second circuit extending through said other winding, said conductor and the remaining portions of said elements, said circuits being so arranged that the voltages thereof between said contact members oppose each other whereby only the unbalanced current of the circuits flows through said common conductor.

7. A control system of the class described comprising, in combination, a regulating device to be actuated, a power operator therefor, means controlling said operator to determine the direction and extent of movement of said device thereby including an induction rotor mounted for a limited degree of angular movement in opposite directions, a magnet arranged to be energized by alternating current and providing a plurality of poles around said rotor, a plurality of shading coils on said poles adapted when short-circuited to induce angular movement of said rotor in opposite directions, a potentiometer system including two rheostats and two circuits controlled thereby and having said coils included therein, one of said rheostats being actuated in the movement of said device by said operator, and means for actuating said other rheostat.

8. In combination with an alternating current motor comprising a stator and a rotor and two sets of opposed shading coils, one set tending to induce rotation of the rotor in one direction and the other set tending to induce rotation of the rotor in the other direction, resistances in closed circuit with each set of shading coils, and means for varying the relative values of these resistances to unbalance the currents flowing in the respective shading coils to cause rotation of the rotor in either desired direction.

9. In combination with an alternating current motor comprising a stator and a rotor and two sets of opposed shading coils, one set tending to induce rotation of the rotor in one direction and the other set tending to induce rotation of the rotor in the other direction, means for unbalancing the currents flowing in the respective shading coils to cause rotation of the rotor in either desired direction, and means automatically adjusted by the resulting rotation of the rotor for restoring the balance between the currents in the respective shading coils.

10. In combination with an alternating current motor comprising a stator, a rotor and two opposed sets of shading coils, one set tending to induce rotation of the rotor in one direction and the other set tending to induce rotation of the rotor in the other direction, a pair of variable resistances in circuit respectively with the two sets of shading coils, a pair of balancing resistances also in circuit with the shading coils, and means actuated by the rotor for adjusting the balancing resistances.

11. In combination with an alternating current motor comprising a stator, a rotor and two opposed sets of shading coils, one set tending to induce rotation of the rotor in one direction and the other set tending to induce rotation of the rotor in the other direction, a pair of variable resistances in circuit respectively with the two sets of shading coils, means responsive to temperature changes for automatically increasing one of the variable resistances and simultaneously decreasing the other, a pair of balancing resistances also in circuit with the shading coils, and means actuated by the rotor for adjusting the balancing resistances.

12. In combination with an alternating current motor comprising a stator, a rotor and two opposed sets of shading coils, one set tending to induce rotation of the rotor in one direction and the other set tending to induce rotation of the rotor in the other direction, a pair of variable resistances in circuit respectively with the two sets of shading coils, means for varying the relative values of these resistances, a pair of balancing resistances also in circuit with the shading coils, and means actuated by rotation of the rotor as caused by the unbalancing of the first mentioned resistances, to adjust the balancing resistances so as to equalize the total effective resistance in circuit with each set of shading coils.

13. In combination with an alternating current motor comprising a stator, a rotor, and two shading coils respectively tending to induce angular movement of said rotor in opposite directions, a pair of variable resistances, means for varying the relative values thereof, a pair of balancing resistances, potentiometer circuits respectively including one of said variable resistances, one of said balancing resistances, and one of said shading coils and operating to control the shading effects produced by the respective shading coils according to the resistance of the respective circuits, and means controlled by the angular movement of said rotor as caused by unbalancing of said variable resistances to adjust the balancing resistances so as to equalize the total effective resistances of the respective potentiometer circuits.

14. In combination with an alternating current motor comprising a stator, a rotor, and two shading coils respectively tending to induce angular movement of said rotor in opposite directions, a pair of resistances each having its opposite terminals connected to the terminals of the respective shading coils, electrically connected contact members each movable in opposite directions to vary the proportion of each resistance element included in the respective circuits through said coils.

15. In combination with an alternating current motor comprising a stator, a rotor, and two shading coils respectively tending to induce angular movement of said rotor in opposite directions, two rheostats having relatively movable contact members, control means for effecting relative movement between said contact members and the associated resistance elements of the respective rheostats, and potentiometer circuits having said rheostats and said shading coils arranged therein so that substantially no current is carried through said contact members when the resistances of said circuits are equalized.

16. The combination of a shaded pole induction motor having a rotor, a stator with a main winding adapted to be energized by alternating current, two shading means on the stator for inducing angular movement of the rotor in opposite directions respectively, two normally closed circuits through said shading means short-circuiting the latter to produce substantially equal and opposing normal shading effects whereby to maintain the rotor stationary, and selectively operable means controlling the relative resistances of said circuits to cause one or the other of said shading means to exert a predominating effect whereby to initiate angular movement of said rotor in a corresponding direction.

17. The combination of a reversible shaded pole induction motor having a stator adapted to be energized by alternating current, a rotor, two shading means normally short-circuited and respectively tending to effect angular movement of the rotor in opposite directions, and control means for varying the circuit resistance of at least one of said shading means for causing one of the shading means to exert sufficiently greater shading effect than the other shading means to induce angular movement of said rotor in one direction while both of said shading means remain short-circuited.

GEORGE FORREST DRAKE.